Patented June 17, 1952

UNITED STATES PATENT OFFICE 2,600,525

CELLULAR GLASS OF INCREASED DURABILITY

Walter D. Ford, Port Allegany, Pa., assignor to Pittsburgh Corning Corporation, Allegheny County, Pa., a corporation of Pennsylvania No Drawing. Application March 12, 1947, Serial No. 734,241

1 Claim. (Cl. 106—40)

The present invention relates to cellular bodies suitable for use as thermal insulation and it has particular relation to cellular bodies formed by bloating or cellulating partially fused glass.

One object of the invention is to provide a cellular glass which has a resistance to water or water vapor at elevated temperatures many times that of the materials heretofore produced.

It has heretofore been proposed to prepare a highly cellulated body of glass suitable for use as heat insulative material and for various other applications, by heating a mixture of finely pulverized glass and an agent designed to give off gases at temperatures near the melting point or sintering point of the glass. The products as thus obtained were of light weight, high resistance to fire, and most chemical agencies including water at ordinary temperatures. However the durability of the material with respect to certain agencies such as water at elevated temperatures was not all that might be desired because the alkali content of the glass tended to leach out, thus causing disintegration or deterioration of the product. Doubtless this action was promoted by reason of the high specific surface of the product. The products as prepared by the foregoing methods enjoy extensive commercial use but some limitations have been placed upon the application of the materials where water or water vapor at elevated temperatures might be encountered.

The present invention is based upon the discovery that complexes of alumina and silica such as feldspar when admixed in finely divided state with powdered glass and a gassing agent prior to cellulation have a capacity of forming cellular bodies of exceptional resistance to the action of moisture at high temperatures. Exceptionally good results have been obtained by the use of finely powdered feldspar as the mineral. However, the invention also contemplates the use of other finely powdered minerals containing alumina and silica such as nepheline syenite, aplite and the like.

In the practice of the invention, the complex of aluminum and silicon such as feldspar, nepheline syenite or aplite is employed in an amount within a range of about 10 to 40% and in most cases the optimum is approximately 20 to 25%. The feldspar or its equivalent may conveniently be added in the desired amount to a suitable glass in the form of cullet. This glass preferably contains a small amount of an oxidizing agent such as sulphate ($SO_3$) combined or dissolved in the glass. The glass and the feldspar may best be admixed to obtain thorough and uniform incorporation by introducing them together in a ball mill and subjecting them to a grinding operation. In this operation the glass and feldspar are reduced to a particle size preferably such that nearly all of the material will pass a screen of 200 mesh and such that the average particle size will be 2500 mesh (5 micron, $2^{-4}$ inch) or even finer. There is no apparent lower limit as to particle size other than that imposed by the economics of grinding.

It will be apparent that the gassing agents should also be incorporated with the mixture of powdered glass and feldspar and this is most conveniently accomplished by introducing the agents before or while the glass and feldspar are being ground in the ball mill. The gassing agents may comprise products such as calcium carbonate or urea designed to decompose at temperatures near or slightly above the sintering point of the glass to form gases designed to bloat or cellulate the material. These agents may be employed in small amounts, e. g. 0.2 to 2% by weight based upon the combined mixture of glass and feldspar.

Other gassing agents that may be employed include forms of carbon such as powdered coal or carbon black. These may be employed in small amounts, e. g. 0.1% to 2% by weight. If carbon black is employed, approximately .17% is satisfactory for most purposes. The carbon black or other form of carbon if employed to produce gases is oxidized by the sulphates in the glass or if they are inadequate, other oxygen giving agents may be added. These include sulphates such as calcium sulphate which may be added in an amount of about 0.1 to 0.4% or antimony trioxide which may be added in an amount, for example .4% or $MoO_3$ in an amount of about 0.1% by weight.

The mixture of glass, feldspar and gassing agent or agents is ground as fine as practicable on the ball mill and is then ready for heating to form cellular glass. This operation may conveniently be performed by placing the mixtures in appropriate amounts in suitable molds of sufficiently refractory material. Molds of stainless steel containing high percentages of nickel and chormium are especially suitable for the purpose. The molds are so constructed that they can be substantially closed, thus protecting the mixture to be sintered from oxidation during the heating operations. The molds should usually be approximately ½ filled, though of course, this will depend to some extent upon the degree of cellulation attained in the final product. The amount in any event should be adjusted just nicely to fill the molds when full cellulation is attained.

The molds may be heated in any convenient furnace but in commercial operation a tunnel furnace having suitable conveyor apparatus such as a train of rollers designed to carry the molds slowly through the heating zone is to be desired. The heating operation is conducted slowly because of the low conductivity of the powdered materials. Usually it will be completed within a period of about 3 to 5 hours dependent upon the thickness and size of the bodies to be formed. The temperature of heating should be sufficient to soften and sinter together the particles of glass and also to cause the gassing agent to react. The mass should never be completely melted. It will vary with individual glasses, but usually will be in or near the range of 1400 to 1600° F.

It will be appreciated that the bodies of cellular material as obtained by the foregoing process should be cooled slightly externally, stripped from the molds and annealed in order to relieve internal stresses in the glass. This annealing operation is comparatively slow, requiring about 15 or 20 hours or longer. The products, after annealing, are trimmed to size and shape.

By application of the process as herein described, bodies of a high degree of cellularity are obtained. The specific gravity will for example be approximately within a range of 0.14 to 0.17 or 0.18. It may even be somewhat lower than this. Usually low specific gravity or density is desirable since the amount of glass required to form such products is correspondingly lowered and, also because of the large amount of entrapped gases, the resistance to transmission of heat is greater than that of less highly cellulated products.

The products are characterized by a resistance to degeneration under the action of moisture at elevated temperatures greater than that of products prepared in conventional manner from pulverized glass and gassing agents without the addition of feldspar or other complex of alumina and silica. Accelerated tests of this resistance to degradation by water at elevated temperatures was conducted by placing appropriate standardized samples of the materials in an autoclave and subjecting them to the action of water at elevated temperatures. The resistance to moisture under the standardized conditions was determined by weighing the samples before and after treatment and also by breaking the samples and observing the depth of penetration of moisture into the cell structure. In preparing standard samples, cylinders of cellular product 4.4 cm. in diameter and 7.7 cm. in length were cut from the slabs or blocks with a core drill. These samples were wet with water, sponged off and weighed. The samples were immersed in water in an autoclave and brought to the temperature corresponding to 90 pounds pressure per square inch for a period of 2 hours. They were then allowed to cool in the autoclave. Subsequently, they were removed, excess water was sponged off and they were again weighed to determine the amount of water taken up. They were also broken and the depth of penetration of water measured in centimeters. Under the conditions described, a sample of common cellular glass will take 70 to 95 grams of water. The results of tests conducted upon laboratory batches containing feldspar are tabulated as follows:

*Table A*

Autoclave test laboratory batches

| Composition + 0.17% Carbon Black | Aver. Sp. G. | Aver. Water Pen't'n in cms. | Aver. Absorb. in gm. | Auto. Pressure in lbs. for 2 hours |
|---|---|---|---|---|
| 75% Glass + 25% Feldspar | 0.172 | 0.53 | 6.63 | 90 |
| 65% Glass + 35% Feldspar | 0.1765 | 0.47 | 4.72 | 90 |
| 90% Glass + 10% Feldspar | 0.1500 | 0.87 | 53.01 | 90 |
| 75% Glass — 25% Feldspar + 0.1% MoO$_3$ | 0.159 | 1.07 | 14.3 | 90 |
| 75% Glass + 25% Aplite | 0.1419 | 1.17 | 27.99 | 90 |
| 80% Glass + 20% Feldspar | 0.1736 | 0.82 | 21.17 | 90 |
| 75% Glass + 25% Feldspar | 0.1727 | 0.58 | 7.63 | 90 |
| 80% Glass + 20% Feldspar (200 mesh) | 0.1886 | 0.86 | 12.87 | 90 |
| 80% Glass + 20% Feldspar (200 mesh) + 0.1 MoO$_3$ | 0.1982 | 0.90 | 23.55 | 90 |

The products containing feldspar in proper amount, aside from their enormously enhanced resistance to water at elevated temperatures, retain the desired low density, low heat conductivity and the physical strength of bodies prepared from glass without feldspar. The batches containing feldspar can be ground and cellulated in the same equipment and under essentially the same heat cycles as the batches free of feldspar.

I claim:

A process of forming cellular glass having high resistance to permeation by water at elevated temperatures and pressures, said process comprising intimately commingling glass containing sulphate reduceable by carbon, 10 to 40% by weight of feldspar, and 0.1 to 0.2% by weight of carbon black, all in pulverulent form, then heating the mixture to a temperature within a range of 1400 to 1600° F. without completely melting the glass while protecting the mixture from oxidation whereby to sinter the mixture by cohering the glass particles and forming cells therein filled with gas, then cooling and annealing the resultant product.

WALTER D. FORD.

REFERENCES CITED

The following references are of record in the file of this patent:

UNITED STATES PATENTS

| Number | Name | Date |
|---|---|---|
| 2,123,536 | Long | July 12, 1938 |
| 2,233,608 | Haux | Mar. 4, 1941 |
| 2,255,236 | Willis | Sept. 9, 1941 |
| 2,306,310 | Haux | Dec. 22, 1942 |
| 2,445,298 | Baker | July 13, 1948 |

FOREIGN PATENTS

| Number | Country | Date |
|---|---|---|
| 490,168 | Great Britain | 1938 |

OTHER REFERENCES

G. W. Morey: "Properties of Glass," pages 170–172, A. C. S. Monograph No. 77, Reinhold Pub. Corp., 1938.

Ceramic Industry: "Feldspar," vol. 32, No. 2, p. 66, Feb. 1939.

D. E. Sharp: "Feldspar as a Constituent of Glass," pp. 1 and 60, 1937.